(12) United States Patent
Bolt

(10) Patent No.: US 9,104,552 B1
(45) Date of Patent: Aug. 11, 2015

(54) METHOD FOR THE USE OF SHADOW GHOST LISTS TO PREVENT EXCESSIVE WEAR ON FLASH BASED CACHE DEVICES

(71) Applicant: Samsung Electronics Co., Ltd., Suwon-si, Gyeonggi-do (KR)

(72) Inventor: Thomas R. Bolt, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 235 days.

(21) Appl. No.: 13/775,214

(22) Filed: Feb. 24, 2013

Related U.S. Application Data

(60) Provisional application No. 61/663,576, filed on Jun. 23, 2012.

(51) Int. Cl.
| | | |
|---|---|---|
| *G06F 12/00* | (2006.01) | |
| *G06F 12/02* | (2006.01) | |
| *G06F 12/12* | (2006.01) | |
| *G06F 12/08* | (2006.01) | |

(52) U.S. Cl.
CPC ........ *G06F 12/0246* (2013.01); *G06F 12/0866* (2013.01); *G06F 12/0868* (2013.01); *G06F 12/12* (2013.01); *G06F 12/123* (2013.01); *G06F 12/127* (2013.01); *G06F 2212/222* (2013.01)

(58) Field of Classification Search
None
See application file for complete search history.

(56) References Cited

U.S. PATENT DOCUMENTS

| | | |
|---|---|---|
| 5,481,691 A | 1/1996 | Day, III et al. |
| 5,673,394 A | 9/1997 | Fenwick et al. |
| 5,765,181 A | 6/1998 | Oberlin et al. |
| 5,983,324 A | 11/1999 | Ukai et al. |
| 5,996,088 A | 11/1999 | Frank et al. |
| 6,000,006 A | 12/1999 | Bruce et al. |
| 6,567,904 B1 | 5/2003 | Khandekar et al. |
| 6,760,815 B1 | 7/2004 | Traversat et al. |
| 6,941,425 B2 | 9/2005 | Osborne |
| 7,047,387 B2 | 5/2006 | Goodsell |
| 7,117,306 B2 | 10/2006 | Rudelic |
| 7,356,651 B2 | 4/2008 | Liu et al. |
| 7,406,473 B1 | 7/2008 | Brassow et al. |
| 7,428,636 B1 | 9/2008 | Waldspurger et al. |
| 7,469,321 B2 | 12/2008 | Heller, Jr. |
| 7,484,073 B2 | 1/2009 | Cohen et al. |
| 7,509,460 B2 | 3/2009 | Zeffer et al. |
| 7,512,769 B1 | 3/2009 | Lowell et al. |
| 7,543,109 B1 | 6/2009 | Bell, Jr. et al. |

(Continued)

FOREIGN PATENT DOCUMENTS

CN 101236530 A 8/2008

OTHER PUBLICATIONS

Peter Desnoyers, "Analytic Modeling of SSD Write Performance", SYSTOR '12 Proceedings of the 5th Annual International Systems and Storage Conference, Jun. 2012, Article No. 12; ACM.

(Continued)

*Primary Examiner* — Shawn X Gu
(74) *Attorney, Agent, or Firm* — Renaissance IP Law Group LLP

(57) ABSTRACT

The present invention is a system and method for utilizing shadow/ghost list to prevent excessive wear on FLASH based cache devices. The method determines when data is highly likely to be accessed again, and avoids writes to a FLASH based caching device when data is unlikely to be accessed again through the use of "shadow" or "ghost" lists that are also used to perform adaptive caching.

12 Claims, 2 Drawing Sheets

(56) References Cited

U.S. PATENT DOCUMENTS

| | | |
|---|---|---|
| 7,620,784 B2 | 11/2009 | Panabaker |
| 7,657,701 B2 | 2/2010 | Shanmuganathan |
| 7,657,706 B2 | 2/2010 | Iyer et al. |
| 7,660,953 B2 | 2/2010 | Ohran |
| 7,702,857 B2 | 4/2010 | Gill et al. |
| 7,734,820 B1 | 6/2010 | Ranade et al. |
| 7,783,839 B2 | 8/2010 | Gill et al. |
| 7,814,276 B2 | 10/2010 | Lin et al. |
| 7,853,960 B1 | 12/2010 | Agesen et al. |
| 7,856,530 B1 | 12/2010 | Mu |
| 7,890,754 B2 | 2/2011 | Waldspurger et al. |
| 7,945,761 B2 | 5/2011 | Subrahmanyam et al. |
| 7,954,150 B2 | 5/2011 | Croft et al. |
| 7,975,109 B2 | 7/2011 | McWilliams et al. |
| 8,386,749 B2 | 2/2013 | Dannowski et al. |
| 2005/0125513 A1 | 6/2005 | Sin-Ling Lam et al. |
| 2005/0232192 A1 | 10/2005 | Rawson, III |
| 2008/0005529 A1 | 1/2008 | Morris |
| 2009/0216910 A1 | 8/2009 | Duchesneau |
| 2010/0191929 A1 | 7/2010 | Rawson, III |
| 2010/0299667 A1 | 11/2010 | Ahmad et al. |
| 2010/0332786 A1 | 12/2010 | Grohoski et al. |
| 2011/0010502 A1 | 1/2011 | Wang et al. |
| 2011/0069725 A1 | 3/2011 | Shkunov et al. |
| 2011/0119669 A1 | 5/2011 | McRae |
| 2011/0208900 A1 | 8/2011 | Schuette et al. |
| 2012/0017049 A1 | 1/2012 | Hass |
| 2012/0023077 A1 | 1/2012 | Kann et al. |
| 2012/0054445 A1 | 3/2012 | Swart et al. |
| 2012/0054447 A1 | 3/2012 | Swart et al. |
| 2012/0066483 A1 | 3/2012 | Boury et al. |
| 2012/0072576 A1 | 3/2012 | Yumerefendi et al. |
| 2012/0072691 A1 | 3/2012 | Kawamura |
| 2012/0079072 A1 | 3/2012 | Serenyi et al. |
| 2012/0096473 A1 | 4/2012 | Durham et al. |
| 2012/0124294 A1 | 5/2012 | Atkisson et al. |
| 2013/0013877 A1 | 1/2013 | Tian |
| 2013/0111146 A1* | 5/2013 | Ash et al. ............ 711/136 |

OTHER PUBLICATIONS

Ismail Ari et al, "ACME: Adaptive Caching Using Multiple Experts", Proceedings of the 2002 Workshop on Distributed Data and Structures (WDAS 2002). Mar. 2002.

* cited by examiner

METHOD FOR THE USE OF SHADOW GHOST LISTS TO PREVENT EXCESSIVE WEAR ON FLASH BASED CACHE DEVICES

CROSS REFERENCE TO RELATED APPLICATION

The present application claims priority to U.S. Provisional Patent Application No. 61/663,576 filed on Jun. 23, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to cache resources for computer systems.

2. Description of the Related Art

Data within computing environments may be cached to high speed devices to improve performance. FLASH memory is well suited for use as a high speed cache device, but unlike RAM or disk drives FLASH memory wears out with repeated write/erase operations. Therefore it is highly advantageous to minimize the number of writes to the FLASH based cache device as well as to only write data to a flash based cache device if it is highly probable that the data will be accessed again.

Caches must be populated with data before they can begin to offload data accesses from slower devices. This involves copying data from the slower device being cached and writing to the higher speed cache device. Unfortunately, although the read performance of FLASH based devices makes them very desirable for use as a cache, FLASH devices wear out with multiple write/erase cycles. Therefore it is advantageous to write data to a FLASH based cache device only if it has a high probability of being accessed again, and it is also advantageous to prevent data being written to the cache device if it is never going to be accessed again.

Traditional general purpose caches use many different algorithms to select data to be cached, and often combine multiple algorithms, sometimes employing adaptive feedback mechanisms. Typical algorithms include, but are not limited to Most Frequently Used (MFU) algorithms that keep counts of how often data is accessed, Most Recently Used (MRU) algorithms that keep track of how recently data has been accessed, and Read Ahead algorithms, that look for sequential patterns in data accesses. When multiple algorithms are used to manage what data is kept in the cache, lists of items that were previously in the cache may be maintained to provide dynamic feedback for selection between caching algorithms or the allocation of caching resources between caching algorithms. These lists of data that have been evicted and are no longer in the cache are often called "shadow" or "ghost" lists.

Traditional caches have been architected around devices that do not appreciably wear out with repeated write/erase cycles, such as Dynamic Random Access Memory (DRAM) or Static Random Access Memory (SRAM) in the case of the block caches of most modern operating systems. In such cases the penalty for writing data to the cache when it will never be accessed again is quite small and little or nothing is done to avoid this occurrence. Another example is the disk based caches used to improve the performance of tape libraries in Hierarchical Storage Management systems (HSMs), where there is no concern over wearing out the disk drives. In these caching applications data is usually entered into the cache device as soon as it is accessed.

Traditional caching algorithms typically provide an "aging" mechanism to evict data from the cache relatively quickly if it is not accessed again. "Shadow" or "ghost" lists are typically implemented in the same manner as the cache algorithm they correspond to, so that if a cache implemented both MRU and MFU algorithms, there would be both MRU and MFU "shadow" or "ghost" lists. The "shadow" or "ghost" lists are aged in the same way as the caches algorithms they represent are, and provide feedback as to how the corresponding algorithm would have performed if it had been allocated more caching resources.

General definitions for terms utilized in the pertinent art are set forth below.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

"Cache" refers to the memory in which data is stored in order to make the data more readily and speedily accessible, transparently. When a cache is exhausted, it is flushed of data, to be replaced with the next cache according to a replacement algorithm.

"Cached data" is data in cache memory duplicating original values stored elsewhere (such as the hard disk) on a computer.

"Cache hit" refers to when the processor looks for data in cache memory and finds the data. A cache hit places less strain on input/output (I/O) resources and limited network resources.

"Cache miss" refers to when the processor looks for data in cache memory and finds that it is not there, resulting in having to read from the main memory or hard disk. Data retrieved during a cache miss is often written into the cache in anticipation of further need for it.

"Caching resources" refers to the physical or virtual components of limited availability required for caches or the process of caching, such as memory or a processing unit.

"Cloud computing" is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

Compatibility library is a software program that provides an interface between computer programs, and in particular an interface that provides an interface between a proprietary environment and an open source or GNU GPL device driver that provides the supporting functionality for the device driver.

"Data center" is a centralized location where computing resources (such as, host computers, servers, applications, databases, or network access) critical to an organization are maintained in a highly controlled physical environment.

Device driver is a software program that allows a hardware device to interact with software installed on the hardware device.

"Execution environments" refers to operating systems or virtual machines in which executable programs are executed. When a computer program is executed, or running, a process is created.

Function pointer is a programming language data type that invokes a function in a computer memory.

Ghost list is a list of recently evicted entries from a cache maintained to be used to adapt a cache algorithm to recent changes. The ghost list does not contain the actual data but only metadata for the listed entry.

GNU, General Public License is a license for an open source operating system based on UNIX, which requires that derived works be distributed under the same license terms.

Hypervisor is a hardware virtualization technique that allows a computer to host multiple operating systems by providing a guest operating system with a virtual operating platform.

Kernel is a component of an operating system that connects a computer's software applications to the computer's hardware.

"Least Recently Used" or "LRU" cache algorithm first evicts the least recently used items on a list of cache items.

"Load balancing" refers to distributing workload across multiple computers, central processing units, or other resources, to achieve optimal resource utilization, maximize throughput, minimize response time, and avoid overload.

"Logical unit number" or "LUN" is an identification number given to logical units (devices) connected to a SCSI "Small Computer System Interface" adapter; typically, the logical disks in a storage area network (SAN).

"Mass storage devices" refers to removable or non-removable media that can store large amounts of data, such as tape drives, redundant array of independent disks (RAID), magnetic disks, or flash drives.

"Non-volatile caching device" refers to a storage device that can retain data within memory even when the device is not powered on, such as a flash drive.

"Open source software" or "OSS" refers to computer software that is available with open access to the source code (design and implementation), which is typically free.

"Process identifier", "process ID", or "PID" is a number used by operating systems (OS) to uniquely identify a process, an OS object that consists of an executable program, a set of virtual memory addresses, and one or more threads. When a program runs, a process is created.

"Virtualization" refers to a computer software/hardware platform that allows running several operating systems simultaneously on the same computer. VMware vSphere Hypervisor™ (ESXi) is an example of a hardware virtualization product.

"Virtualized environment" refers to hypervisor, or virtualization, systems.

Virtual Machine is a software abstraction of a physical computer.

"Web-Browser" is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

"Web-Server" is a computer able to simultaneously manage many Internet information-exchange processes at the same time. Normally, server computers are more powerful than client computers, and are administratively and/or geographically centralized. An interactive-form information-collection process generally is controlled from a server computer.

Unfortunately traditional cache management policies can have the effect of turning read dominated access patterns, which is the most general case, into write dominated access patterns for the caching device. This is detrimental in terms of device lifespan as well as device performance if the cache device is FLASH based.

BRIEF SUMMARY OF THE INVENTION

The present invention is a method for determining when data is highly likely to be accessed again and avoiding writes to a FLASH based caching device when data is unlikely to be accessed again through the use of "shadow" or "ghost" lists that are also used to perform adaptive caching. The combined usage for both identifying good and bad caching candidates as well as providing a feedback mechanism for adaptive caching strategies has the additional benefit of minimizing overhead for the management of the cache device.

The main objective of the present invention is identify good candidates for caching in a FLASH based cache device as well as to rule out bad candidates, and doing both while minimizing the overhead associated with storage for data structures used to manage the data in the FLASH based cache device.

The present invention preferably requires that a data location be accessed multiple times prior to ever being written to the cache device. This prevents data that is accessed only once from wearing out a FLASH based cache device. The threshold for the number of times a data location must be access prior to being written to the cache device is implementation dependent and may be altered. Furthermore this mechanism utilizes an extension to the concept of a "shadow" or "ghost" list to track items that are not in the cache but are candidates for writing to the cache if access thresholds are met. Using the mechanism of a "shadow" or "ghost" list also provides for the aging and eviction of candidates, such that data that is accessed enough to meet the minimum threshold to be written to the cache device can be prevented from doing so if the accesses are dispersed over long time intervals. This prevents activities that occur infrequently but on a recurring basis such as full backup procedures that read every data location every week from causing data to be written to the cache device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
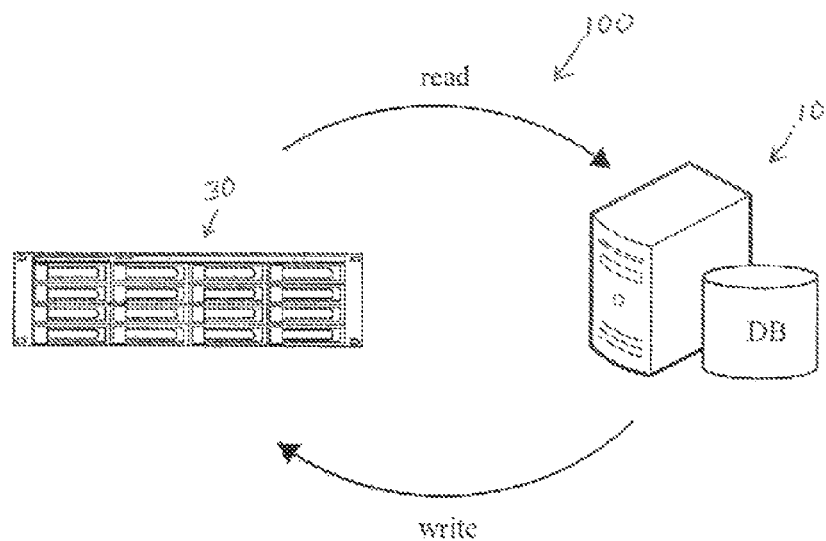
FIG. 1 is a block diagram of data transfers between a high speed cache device and a slower mass storage device.

FIG. 1 illustrates a system 100 for utilizing shadow/ghost list to prevent excessive wear on FLASH based cache devices. The system 100 preferably comprises a mass storage device 10 and a high speed device 30. Data is read and then written to the high speed cache device.

Figure 2:
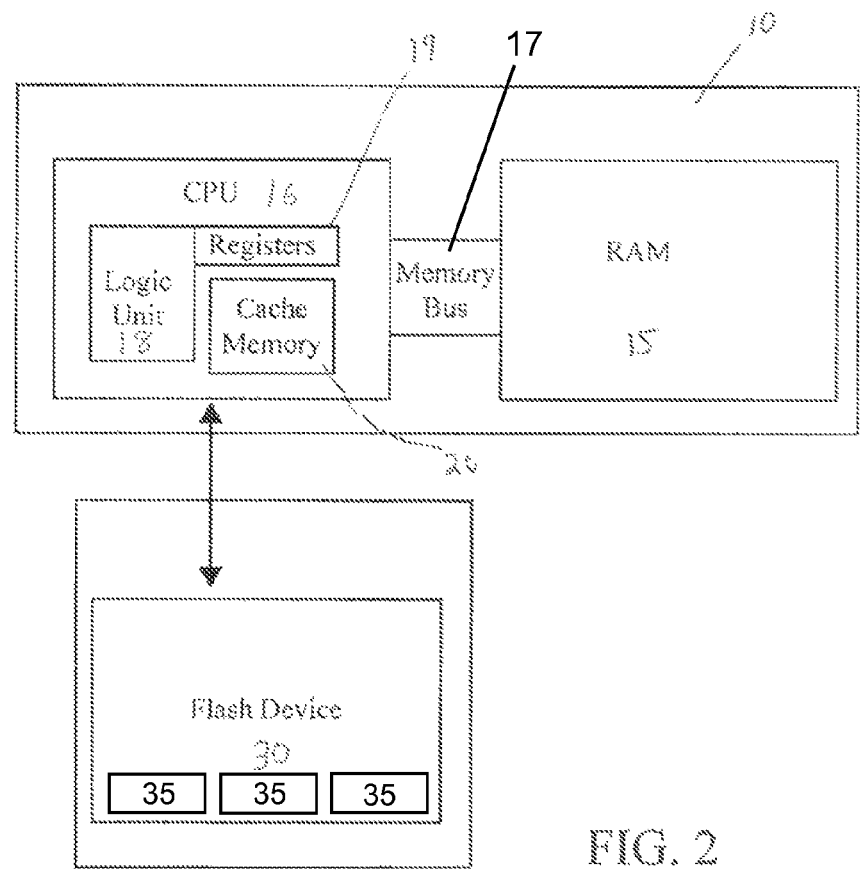
FIG. 2 is a block diagram of a high speed FLASH based cache device and a slower mass storage device.

As shown in FIG. 2, the mass storage device 10 preferably comprises a memory 15, a central processing unit 16, a memory bus 17, a logic unit 18, registers 19 and a cache memory 20. The high speed cache device 30 preferably comprises an input/output interface (not shown), a memory (not shown), a processor (not shown), a buffer manager (not shown), a flash controller (not shown) and multiple flash memory modules 35.

Figure 3:
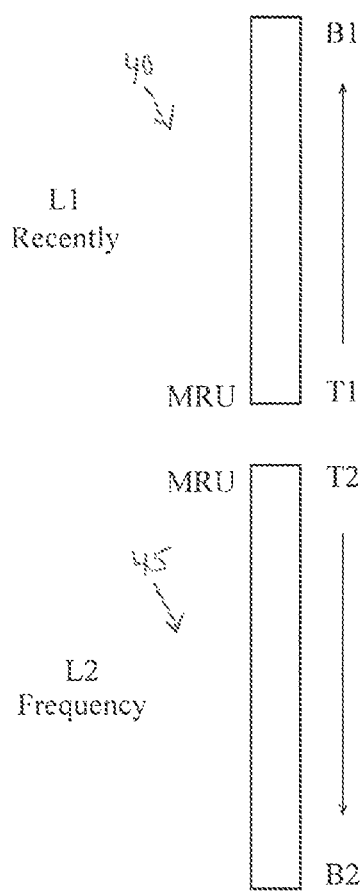
FIG. 3 is an illustration of a list L1 of Most Recently Used data and a list L2 of Most Frequently Used data.

FIG. 3 is an illustration of a list L1 of Most Recently Used ("MRU") data 40 and a list L2 of Most Frequently Used ("MFU") data 45.

The preferred embodiment of a method for utilizing shadow/ghost list to prevent excessive wear on FLASH based cache devices comprises defining an indicator within a "shadow" or "ghost" entry. The indicator entry indicates that instead of being a "shadow" or "ghost" of data that has been evicted from the cache, the indicator entry represents what would have happened if the data was kept in the cache. The indicator entry is referred to as a "glimmer" entry of data that may never have been in the cache, and the entry represents what would have happened if the data had been allowed into the cache.

Since "shadow/ghost" list entries typically contain all of the metadata used to manage a cache entry of the associated algorithm (i.e. timestamps, use counts, etc.) the method of the present invention allows for the selection of items to be written to the cache to be based on the policies that are used to manage the cache itself, with thresholds for the number of times the data has been accessed for MFU caches, as well as the temporal locality of the data accesses for MRU caches. By using the same lists as are used by the adaptive feedback mechanism of the competing cache algorithms, the "glimmer" entries provide forward looking feedback to the adaptive mechanism instead of the historical feedback provided by "shadow" or "ghost" entries.

Finally, by using the same list structures and resources for both the "shadow/ghost" lists and the "glimmer" lists, the amount of memory/storage resources necessary to manage the cache device can be reduced.

Alternatively, this mechanism may be implemented with "glimmer" lists separate from any "shadow/ghost" lists, although more memory/storage resources would be consumed to manage the cache device.

The present invention prevents data from wearing out a FLASH based cache device 30 if it is never accessed again or not accessed again within a given temporal locality. By tracking candidates for inclusion in the FLASH based cache device 30 prior to the associated data being written to the FLASH based cache device 30, the method of the present invention allows thresholds to be implemented for both the number of times a data location is accessed as well as the timeframe within which the accesses must occur before data is written to the FLASH based cache device 30. The thresholds prevent data from being written to the FLASH based cache device 30 unless it is accessed more than once and with a high probability of being accessed again. The threshold policy for selection of data to be written to the FLASH based cache device 30 prevents writes and the associated wear of FLASH based cache devices 30 from happening with data that is either accessed only once or on an infrequent basis.

The present invention reuses data structures already used to provide feedback to adaptive caching algorithms. By utilizing the structures, algorithms, and techniques normally used for feedback to adaptive caching, the method of the present invention is implemented by an adaptation of "shadow" or "ghost" lists, and is implemented within the same "shadow/ghost" lists by the creation of an indication of an entry being a "glimmer" entry that has either never been known to the cache or evicted both from the cache itself as well as the "shadow/ghost" list. The indication of an entry in the "shadow/ghost" list being a "glimmer" entry can be through the use of an entry type identifier (which may already exist to distinguish a MRU "shadow/ghost" entry from a MFU "shadow/ghost" entry), or a separate type or flag field. Depending upon the approach used, the "glimmer" entries may take little or no additional storage to manage.

The present invention provides forward looking information to adaptive caching algorithms about data that is likely to be added to the cache. Whereas "shadow/ghost" list entries represent what would have happened if a data location previously contained in the cache had not been evicted from the cache, "glimmer" entries represent data locations that may be added to the cache in the near future. As such "shadow/ghost" data represents feedback to adaptive algorithms based on past history within the cache, while "glimmer" entries provide adaptive feedback that predicts what is likely to be added to the cache. This forward looking feedback may help the adaptive caching mechanisms to react more quickly to changing access patterns of the data being cached.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for utilizing a ghost list to prevent excessive wear on FLASH based cache devices, the method comprising:
    determining if data represented on at least one glimmer entry on a ghost entry of a plurality of entries of the ghost list of at least one cache algorithm for a cache has been accessed in excess of a threshold number of times, the at least one glimmer entry representing what would have happened if the data represented on the at least one glimmer entry would have remained in the cache;
    determining a temporal locality of data accesses of the data represented on the ghost entry of the plurality of entries of the ghost list; and
    writing the data to a high speed FLASH based cache device if the data has been accessed in excess of the threshold and accessed within a predetermined time range based on the temporal locality of the data accesses.

2. The method according to claim 1 wherein the data is written to the high speed FLASH based cache device from a mass storage device.

3. The method according to claim 1 further comprising generating a glimmer list comprising a plurality of entries from the ghost list.

4. The method according to claim 1 wherein the at least one glimmer entry is generated through the use of an entry type identifier.

5. A method for preventing wear on a FLASH-based cache device, the method comprising:

tracking a plurality of candidates for inclusion in a cache of the FLASH-based cache device prior to associated data for each of the plurality of candidates being written to the cache, the plurality of candidates comprising a plurality of glimmer entries generated from at least one caching algorithm ghost list, each glimmer entry of the plurality of glimmer entries representing what would have happened if the data for the glimmer entry would have remained in the cache;

identifying a number of times a data location for associated data for each of the plurality of candidates is accessed and a timeframe within which accesses occur;

determining if data location has been accessed in excess of a threshold number of times within a predetermined timeframe; and writing the data for each of the plurality of candidates to the cache of the FLASH based device if the data location for the associated data of each of the plurality of candidates has been accessed in excess of the threshold and accessed within a predetermined time range.

6. The method according to claim 5 wherein data is written to the FLASH based cache device from a mass storage device.

7. The method according to claim 5 further comprising generating a glimmer list comprising a plurality of glimmer entries.

8. The method according to claim 7 wherein at least one glimmer entry is generated through the use of an entry type identifier.

9. A method for utilizing a ghost list to prevent excessive wear on FLASH based cache devices, the method comprising:

identifying at least one glimmer entry from a plurality of entries of a ghost list for at least one cache algorithm, wherein the at least one glimmer entry represents what would have happened if data represented by the at least one glimmer entry would have remained in a cache;

determining if the data represented by the at least one glimmer entry has been accessed in excess of a threshold number of times for at least one Most Frequently Used (MFU) cache;

determining temporal locality of data accesses of the data for the at least one glimmer entry for Most Recently Used (MRU) caches; and writing the data to a high speed FLASH-based cache device if the data has been accessed in excess of the threshold and accessed within a predetermined time range based on the temporal locality of the data accesses.

10. The method according to claim 9 wherein the data is written to the high speed cache device from a mass storage device.

11. The method according to claim 10 further comprising generating a glimmer list comprising a plurality of glimmer entries.

12. The method according to claim 9 wherein the at least one glimmer entry is generated through the use of an entry type identifier.

* * * * *